US012628169B2

(12) United States Patent (10) Patent No.: US 12,628,169 B2
Yu et al. (45) Date of Patent: May 12, 2026

(54) DEVICE AND METHOD FOR FORWARDING DATA FROM A REMOTE DEVICE TO A NETWORK NODE

(71) Applicant: Nokia Technologies Oy, Espoo (FI)

(72) Inventors: Ling Yu, Kauniainen (FI); Vinh Van Phan, Oulu (FI); Faranaz Sabouri-Sichani, Aalborg (DK); Berthold Panzner, Holzkirchen (DE); Prajwal Keshavamurthy, Munich (DE); Nuno Manuel Kiilerich Pratas, Gistrup (DK)

(73) Assignee: NOKIA TECHNOLOGIES OY, Espoo (FI)

( * ) Notice: Subject to any disclaimer, the term of this patent is extended or adjusted under 35 U.S.C. 154(b) by 415 days.

(21) Appl. No.: 18/101,857

(22) Filed: Jan. 26, 2023

(65) Prior Publication Data

US 2023/0246787 A1 Aug. 3, 2023

(30) Foreign Application Priority Data

Jan. 28, 2022 (EP) .................................... 22154050

(51) Int. Cl.
*H04W 72/21* (2023.01)
*H04W 72/1268* (2023.01)
(Continued)

(52) U.S. Cl.
CPC ....... *H04W 72/21* (2023.01); *H04W 72/1268* (2013.01); *H04W 28/0278* (2013.01); *H04W 88/04* (2013.01)

(58) Field of Classification Search
CPC ......... H04W 28/0278; H04W 72/1268; H04W 72/21; H04W 88/04
See application file for complete search history.

(56) References Cited

U.S. PATENT DOCUMENTS 10,863,561 B2 12/2020 Li et al.
10,869,329 B2 12/2020 Xu et al.
(Continued)

FOREIGN PATENT DOCUMENTS

CN 113301604 A 8/2021
CN 113923711 A 1/2022
(Continued)

OTHER PUBLICATIONS

3GPP ETSI TS 138 321 v16.4.0 (Apr. 2021)—160 pgs.
(Continued)

*Primary Examiner* — Pao Sinkantarakorn
(74) *Attorney, Agent, or Firm* — Lippes Mathias LLP

(57) ABSTRACT

An intermediate apparatus and method for relaying data from a remote wireless device to a base station with reduced latency is discussed. The method includes the steps of receiving a transmission having control information and data. Determining from the control information that the data is to be forwarded to a wireless communication node and that a future data transmission comprising data to be forwarded is scheduled. Estimating from the control information an amount of the data in the future data transmission. Generating a resource request comprising the estimated amount of data in the future data transmission and transmitting, the resource request towards the wireless communication node.

17 Claims, 5 Drawing Sheets

(51) Int. Cl.
  *H04W 28/02*     (2009.01)
  *H04W 88/04*     (2009.01)

(56)           References Cited

U.S. PATENT DOCUMENTS

| | | | |
|---|---|---|---|
| 10,893,557 | B2 | 1/2021 | Gulati et al. |
| 11,071,092 | B2 | 7/2021 | Kuang et al. |
| 2009/0014506 | A1 | 1/2009 | Chang |
| 2016/0338095 | A1* | 11/2016 | Faurie .................. H04W 72/20 |
| 2019/0014606 | A1* | 1/2019 | Li .......................... H04W 72/20 |
| 2020/0196387 | A1 | 6/2020 | Roy et al. |
| 2020/0367317 | A1 | 11/2020 | Feng |
| 2021/0127385 | A1 | 4/2021 | Kung et al. |
| 2021/0127402 | A1 | 4/2021 | Lee et al. |
| 2021/0298043 | A1 | 9/2021 | He et al. |
| 2022/0256576 | A1* | 8/2022 | Wu ...................... H04W 72/21 |
| 2023/0309161 | A1* | 9/2023 | Rao ...................... H04L 5/0048 |
| 2023/0345564 | A1* | 10/2023 | Srinivasan ............ H04W 76/14 |
| 2024/0422617 | A1* | 12/2024 | Freda .................... H04W 40/22 |

FOREIGN PATENT DOCUMENTS

| | | | |
|---|---|---|---|
| EP | 3338510 | A1 | 6/2018 |
| EP | 3338510 | B1 | 6/2018 |
| EP | 3641460 | A1 | 4/2020 |
| WO | WO 2017/029646 | A1 | 2/2017 |
| WO | WO 2021/194271 | A1 | 9/2021 |

OTHER PUBLICATIONS

CATT, "Long BSR Format with Extended LCG", 3GPP TSG-RAN WG2 Meeting #116e, R2-2109582, Nov. 1-12, 2021, 4 pgs.
Gamboa, et al. "UE-to-Network Relay Discovery in Pro-Se-enabled LTE Networks", 2020 International Conference on Computing, Networking and Communications (ICNC), pp. 840-846.

* cited by examiner

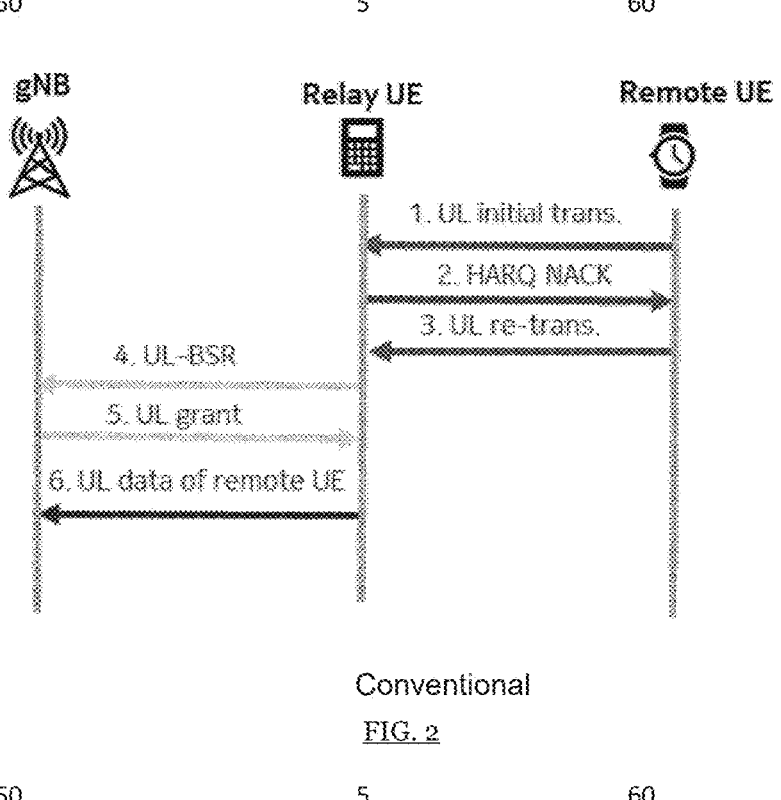
Conventional
FIG. 2

5

8

10

12

20

22

26

60

24

50

DEVICE AND METHOD FOR FORWARDING DATA FROM A REMOTE DEVICE TO A NETWORK NODE

TECHNOLOGICAL FIELD

Various example embodiments relate to relaying data from a wireless device to a network node of a wireless communication network via an intermediate relaying apparatus.

BACKGROUND

Device to device (D2D) transmission is becoming increasingly common. New Radio NR uses higher frequencies than conventional 3G devices, and the effective distances that signals at these higher frequencies can travel is significantly reduced. This makes D2D communication more important providing a way of transmitting data in multiple stages or hops to a device with backhaul functionality. Transmitting data in multiple hops can significantly increase the latency of the data transmissions, particularly where resource for each transmission needs to be requested and provided before the data can be transmitted.

Embodiments seek to reduce the delay in such multiple device transmissions.

BRIEF SUMMARY

The scope of protection sought for various embodiments of the disclosure is set out by the independent claims. The examples and features, if any, described in this specification that do not fall under the scope of the independent claims are to be interpreted as examples useful for understanding various embodiments of the disclosure.

According to various, but not necessarily all, embodiments of the invention there is provided according to a first aspect an apparatus comprising: means for receiving a transmission comprising control information and data; means for determining from said control information that said data is to be forwarded to a wireless communication node and that a future data transmission comprising data to be forwarded is scheduled; means for estimating from said control information an amount of said data in said future data transmission; means for generating a resource request said resource request comprising said estimated amount of said data in said future data transmission; and means for transmitting, said means for transmitting being configured to transmit said resource request towards said wireless communication node.

Where data is to be transmitted via an intermediate device that is in multiple stages or hops, the latency of the multiple stage transmission can be quite long. This is particularly so if there is a delay in acquiring a resource for the onward transmission. This delay could be reduced if resource for any onward transmission is requested in advance. However, where control information and data are transmitted in a transmission together, in some cases in a same slot or TTI (transmission time interval), then providing an advance request for resource for onward transmission of this data based on control information is not straightforward. However, it was recognised that the control information received may also be relevant to one or more future data transmissions and that were this information to be used to estimate an amount of data of such future transmissions, then a resource for the onward transmission of the data received in such future transmissions could be requested prior to the arrival of the data, thereby reducing latency.

In some embodiments said scheduled future data transmission comprises a retransmission of said data or a periodic data transmission.

Control information regarding future data transmissions may be received where the data from the original transmission is not correctly received and cannot be decoded and thus, one or more retransmissions of this data will occur. In such a case increased latency is a particular problem, however, the control information sent in the original transmission will be relevant for any retransmissions. Thus, where the data cannot be decoded but the control transmission can, an advance resource request can be generated such that when the data retransmission does occur a resource for the onward transmission is quickly available. The control information received may also be relevant in other cases such as where the data is one of a set of periodic data transmissions, such that the control information is again relevant for future data transmissions of this periodic set.

In some embodiments, said control information comprises information regarding frequency resource and modulation and coding scheme that is to be used in said future data transmission, said means for estimating estimating said amount of said data from said frequency resource and modulation and coding scheme information.

In some embodiments, said control information further comprises a priority indication indicative of a priority of said data in said future data transmission; said means for estimating is configured to estimate from said priority indication and from a mapping from previously received data with said priority indication to a logical channel group for forwarding said data; said means for generating said resource request generating a buffer status report, said buffer status report comprising said amount of data and said logical channel group.

In some embodiments, said transmission is received on one or more sidelink channels.

In some embodiments, said one or more sidelink channel comprises a channel over PC5 interface.

In some embodiments, said control information further comprises time resource assignment, said time resource assignment indicating timings of said at least one future data transmission; and wherein said means for estimating is configured to determine a time for transmission of said generated resource request in dependence upon said time resource assignment.

In some embodiments, said means for estimating is configured to estimate a time of receipt of said future data transmission in dependence upon said time resource assignment, said determined time for transmission of said generated resource request is determined to be prior to said estimated time of receipt of said future data transmission.

In some embodiments said determined time is selected to be within a predetermined time period prior to the estimated time of receipt of the future data transmission.

In some embodiments, said future data transmission comprises said data retransmission and said time resource assignment indicates a timing of a plurality of said data retransmissions and said means for estimating is configured to select one of said data retransmission timings when estimating said time of receipt of said data retransmission.

In some embodiments, said means for estimating is configured to determine a quality of a channel said transmission is received on and to select said one of said data retransmission timings in dependence upon said channel quality, a higher channel quality triggering selection of an earlier one of said plurality of data retransmission timings.

In some embodiments, said means for estimating is configured to determine a resource allocated for said data retransmission and to select said one of said data retransmission timings in dependence upon said resource allocated.

In some embodiments, said means for transmitting is configured to transmit said resource request towards said wireless communication node at said time determined by said means for estimating.

In some embodiments, said apparatus further comprises: means for receiving a grant of resource in response to said resource request; wherein said means for transmitting is configured in response to receipt of said grant of resource to transmit said data of said future data transmission on said granted resource where said future data transmission has been received and where said future data transmission has not been received to transmit an updated resource request on said granted resource.

In some embodiments, the means comprise: at least one processor; and at least one memory including computer program code, the at least one memory and computer program code being configured to, with the at least one processor, cause the performance of the apparatus.

According to various, but not necessarily all, embodiments of the invention there is provided a system comprising: a remote wireless device; a further wireless communication network node; and an apparatus according to a first aspect, said apparatus comprising a relay node for relaying data from said remote wireless device to said further wireless communication network node; wherein said remote wireless device is configured to transmit wireless communication signals comprising control information and said data on one or more sidelink channels to said apparatus; said apparatus is configured to estimate an amount of said data from said control information and to generate a resource request and to transmit said resource request to said further wireless communication network node; and said further wireless communication network node is configured to provide a grant of resource for transmission of said data from said apparatus to said further wireless communication network node in response to receipt of said resource request.

In some embodiments, said further wireless communication network node is a base station. In some embodiments, said apparatus comprises a user equipment.

According to various, but not necessarily all, embodiments of the invention there is provided a method comprising: receiving a transmission comprising control information and data; determining from said control information that said data is to be forwarded to a wireless communication node and that a future data transmission comprising data to be forwarded is scheduled; estimating from said control information an amount of said data in said future data transmission; and generating a resource request said resource request comprising said estimated amount of said data in said future data transmission; and transmitting, said means for transmitting being configured to transmit said resource request towards said wireless communication node.

In some embodiments said scheduled future data transmission comprises a retransmission of said data or a periodic data transmission.

In some embodiments, said control information comprises information regarding frequency resource and modulation and coding scheme that is to be used in said future data transmission, and said step of estimating estimating said amount of said data from said frequency resource and modulation and coding scheme information.

In some embodiments, said control information further comprises a priority indication indicative of a priority of said data in said future data transmission; said step of estimating estimating from said priority indication and from a mapping from previously received data with said priority indication to a logical channel group for forwarding said data; said step of generating said resource request generating a buffer status report, said buffer status report comprising said amount of data and said logical channel group.

In some embodiments, said control information further comprises time resource assignment, said time resource assignment indicating timings of said at least one future data transmission; and said step of estimating determining a time for transmission of said generated resource request in dependence upon said time resource assignment.

In some embodiments, said step of estimating estimates a time of receipt of said future data transmission in dependence upon said time resource assignment, said determined time for transmission of said generated resource request being determined to be prior to said estimated time of receipt of said future data transmission.

In some embodiments said method comprises estimating said determined time to be within a predetermined time period prior to the estimated time of receipt of the future data transmission.

In some embodiments, said future data transmission comprises said data retransmission and said time resource assignment indicates a timing of a plurality of said data retransmissions and said step of estimating selects one of said data retransmission timings when estimating said time of receipt of said data retransmission.

In some embodiments, said step of estimating determines a quality of a channel said transmission is received on and to select said one of said data retransmission timings in dependence upon said channel quality, a higher channel quality triggering selection of an earlier one of said plurality of data retransmission timings.

In some embodiments, said step of estimating determines a resource allocated for said data retransmission and selects said one of said data retransmission timings in dependence upon said resource allocated.

In some embodiments, said step of transmitting transmits said resource request towards said wireless communication node at said time determined in said step of estimating.

In some embodiments, said method further comprises: receiving a grant of resource in response to said resource request; and in response to receipt of said grant of resource transmitting said data of said future data transmission on said granted resource where said future data transmission has been received and where said future data transmission has not been received retransmitting an updated resource request on said granted resource.

According to various, but not necessarily all, embodiments of the invention there is provided a computer program comprising instructions for causing an apparatus to perform at least the following: determining from control information received in a transmission comprising data and said control information, that said data is to be forwarded to a wireless communication node and that a future data transmission comprising data to be forwarded is scheduled; estimating from said control information an amount of said data in said future data transmission; and generating a resource request said resource request comprising said estimated amount of said data in said future data transmission.

In some embodiments the computer program comprises instructions for causing an apparatus to perform a method according to the embodiments described above.

According to various, but not necessarily all, embodiments of the invention there is provided an apparatus comprising: circuitry configured to receive a transmission comprising control information and data; circuitry configured to determine from said control information that said data is to be forwarded to a wireless communication node and that a future data transmission comprising data to be forwarded is scheduled; circuitry configured to estimate from said control information an amount of said data in said future data transmission; and circuitry configured to generate a resource request said resource request comprising said estimated amount of said data in said future data transmission; and circuitry configured to transmit, said circuitry configured to transmit being configured to transmit said resource request towards said wireless communication node.

In some embodiments, said control information comprises information regarding frequency resource and modulation and coding scheme that is to be used in said future data transmission, said circuitry configured to estimate estimating said amount of said data from said frequency resource and modulation and coding scheme information.

In some embodiments, said control information further comprises a priority indication indicative of a priority of said data in said future data transmission; said circuitry configured to estimate estimating from said priority indication and from a mapping from previously received data with said priority indication to a logical channel group for forwarding said data; said circuitry configured to generate generating a buffer status report, said buffer status report comprising said amount of data and said logical channel group.

In some embodiments, said control information further comprises time resource assignment, said time resource assignment indicating timings of said at least one future data transmission; and wherein said circuitry configured to estimate being configured to determine a time for transmission of said generated resource request in dependence upon said time resource assignment.

In some embodiments, said circuitry configured to estimate is configured to estimate a time of receipt of said future data transmission in dependence upon said time resource assignment, said determined time for transmission of said generated resource request is determined to be prior to said estimated time of receipt of said future data transmission.

In some embodiments, said future data transmission comprises said data retransmission and said time resource assignment indicates a timing of a plurality of said data retransmissions and said circuitry configured to estimate is configured to select one of said data retransmission timings when estimating said time of receipt of said data retransmission.

In some embodiments, said circuitry configured to estimate is configured to determine a quality of a channel said transmission is received on and to select said one of said data retransmission timings in dependence upon said channel quality, a higher channel quality triggering selection of an earlier one of said plurality of data retransmission timings.

In some embodiments, circuitry configured to estimate is configured to determine a resource allocated for said data retransmission and to select said one of said data retransmission timings in dependence upon said resource allocated.

In some embodiments, said circuitry configured to transmit is configured to transmit said resource request towards said wireless communication node at said time determined by said circuitry configured to estimate.

In some embodiments, said apparatus further comprises: circuitry configured to receive a grant of resource or an allocated resource in response to said resource request;

wherein said circuitry configured to transmit is configured in response to receipt of said grant of resource to transmit said data of said future data transmission on said granted resource where said future data transmission has been received and where said future data transmission has not been received to transmit an updated resource request on said granted resource.

According to various, but not necessarily all, embodiments of the invention there is provided an apparatus comprising at least one processor; and at least one memory including computer program code; the at least one memory and the computer program code configured to, with the at least one processor cause the apparatus at least to perform: determining from control information received in a transmission comprising data and said control information, that said data is to be forwarded to a wireless communication node and that a future data transmission comprising data to be forwarded is scheduled; estimating from said control information an amount of said data in said future data transmission; and generating a resource request said resource request comprising said estimated amount of said data in said future data transmission.

Further particular and preferred aspects are set out in the accompanying independent and dependent claims. Features of the dependent claims may be combined with features of the independent claims as appropriate, and in combinations other than those explicitly set out in the claims.

Where an apparatus feature is described as being operable to provide a function, it will be appreciated that this includes an apparatus feature which provides that function or which is adapted or configured to provide that function.

BRIEF DESCRIPTION

Some example embodiments will now be described with reference to the accompanying drawings in which:

FIG. 2 shows a conventional procedure for remote UE's UL data delivery;

Figure 4:
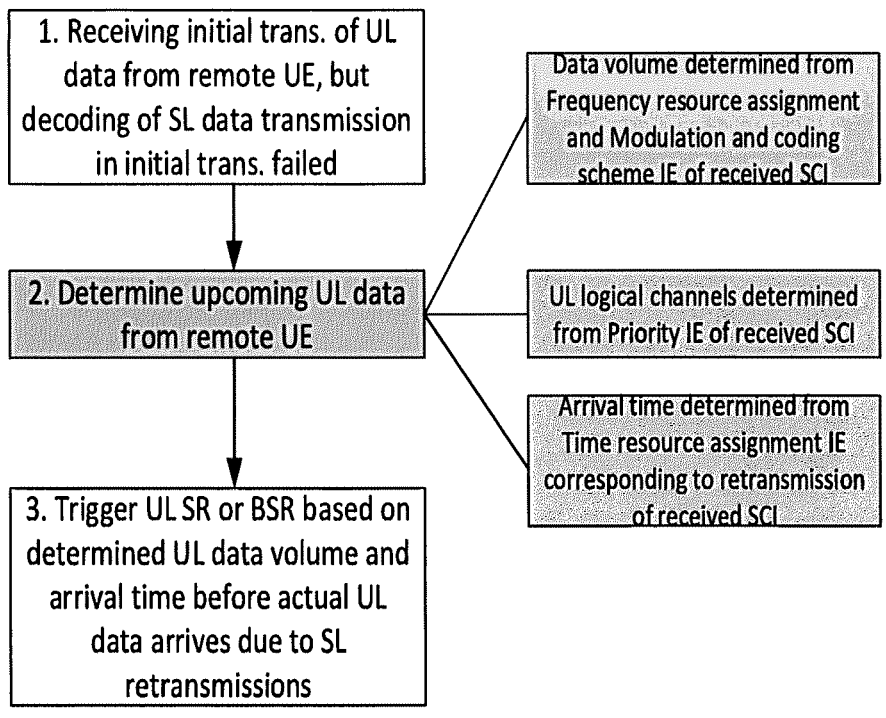
Figure 5:
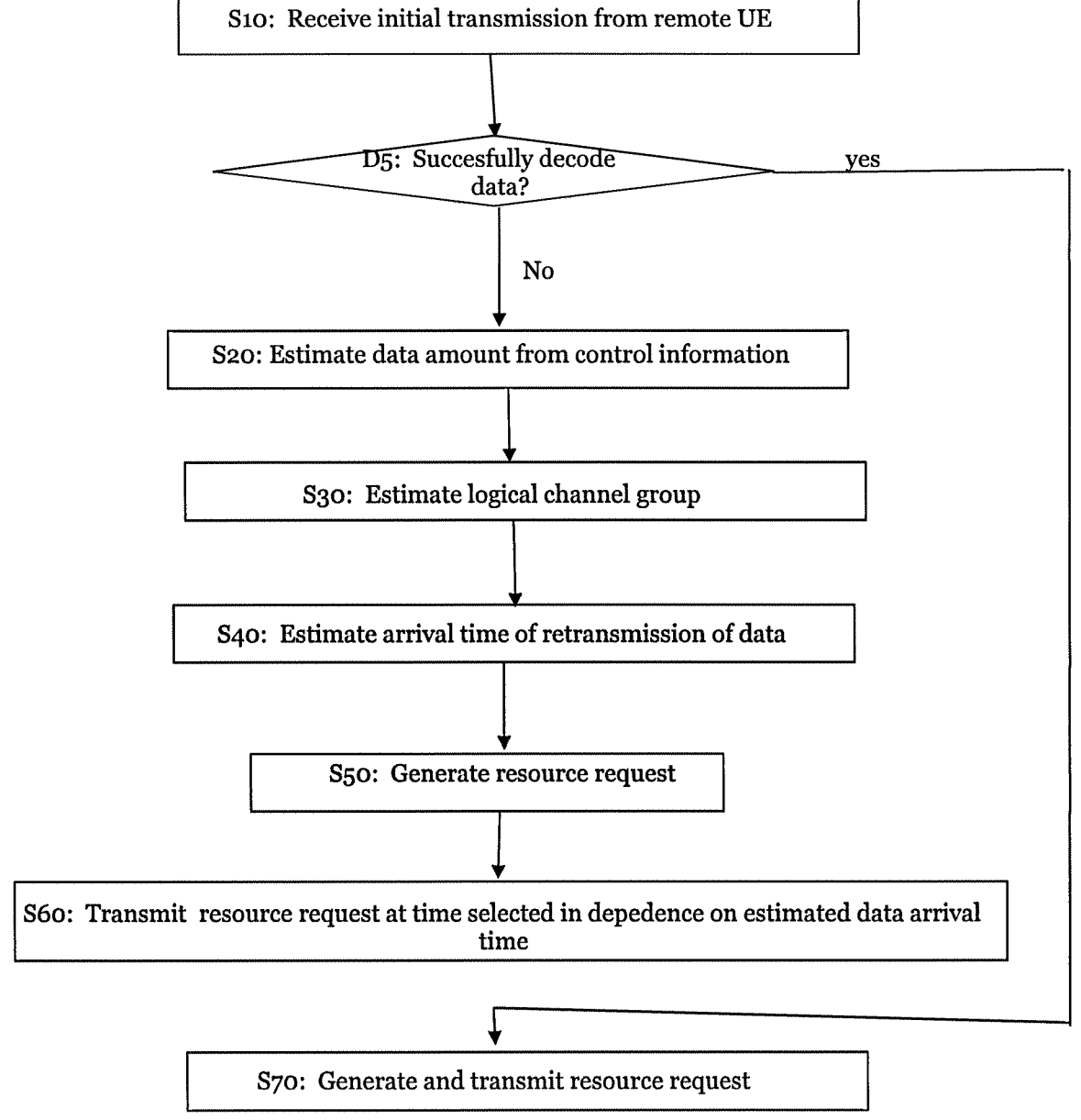
Figure 6:
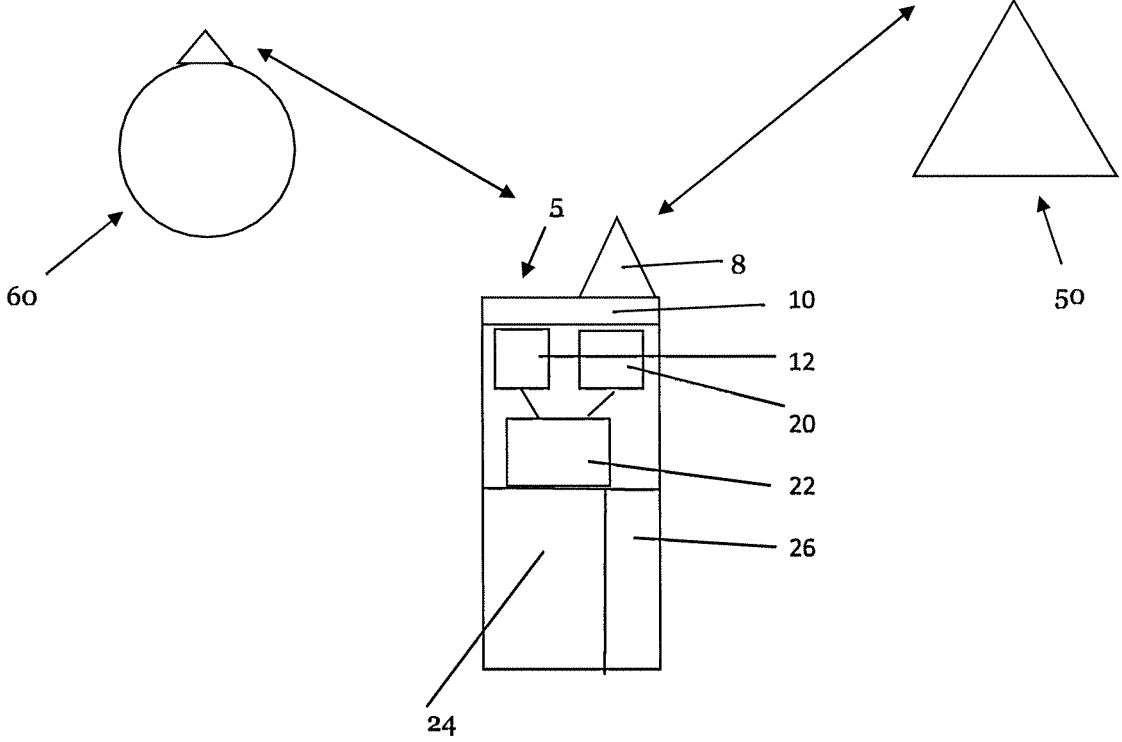

FIG. 4 schematically illustrates a method according to an embodiment;

FIG. 5 schematically shows a flow diagram illustrating steps in a method according to an embodiment; and FIG. 6 schematically shows a system according to an embodiment.

DETAILED DESCRIPTION

Before discussing the example embodiments in any more detail, first an overview will be provided.

This disclosure is based on the idea that a relay UE (user equipment) can estimate/predict upcoming UL data arrival from remote UE so that an early UL resource request (e.g. UL SR UL scheduling request and/or UL-BSR UL buffer status report) can be sent to gNB before the actual data arrives in the relay UE's data buffer.

This disclosure focusses in particular on how the UE determines/predicts the remote UE's UL data arrival based on SCI (sidelink control information) of the initial SL (sidelink) transmission from the remote UE when the initial SL transmission is not correctly received by relay UE and therefore the relay UE expects that a retransmission (either HARQ feedback based retransmission or blind retransmission without HARQ feedback) of that payload will take place soon. It is also relevant for periodic data transmissions, where the control information is relevant for a set of data transmissions that will occur periodically. The control portion of the transmission may be Sidelink Control Information (SCI) and may be sent on the PSCCH (physical sidelink control channel). The SCI carries the information the receiving UE requires in order to be able to receive and demodulate the data that is sent as part of the same transmission (i.e. transmitted in the same time slot), on the PSSCH (physical sidelink shared channel).

According to standardized UL BSR MAC CE format (uplink buffer status report medium access control control element), relay UE needs to determine the following information in order to send the early UL resource request to gNB for the estimated upcoming UL data arrival from remote UE:

The data volume (corresponding to buffer size of UL BSR MAC CE) of the upcoming UL data from remote UE. This may be determined from the Frequency resource assignment and Modulation and coding scheme information elements (IE) in SCI. When remote UE transmits UL data to relay UE via SL, remote UE indicates the resource allocation in the SCI for initial transmission as well as retransmission. If relay UE can receive SCI correctly, the data volume of the upcoming UL data can be determined from Frequency resource assignment and Modulation and coding scheme even if initial transmission of SL data part is not correctly received.

The UL logical channel (LC) of the upcoming UL data of remote UE may be determined based on Priority IE in SCI. Though the priority of SL communication is not directly linked with UL LC, relay UE can learn from previous SL transmissions from remote UE to the relay UE which SL LCs that SL transmission with indicated priority is mapped to. Relay UE is also configured by gNB with the mapping from SL LCs to the UL LCs during SL relaying connection establishment. Thus, relay UE is able to determine UL LCs from Priority IE in SCI of initial SL transmission from remote UE.

Based on determined UL LCs of the upcoming UL data and the configuration of UL LCs to logical channel group (LCG) mapping, relay UE can form the LCG field of UL BSR MAC CE as early resource request to gNB.

As there is no UL data arrival timing information in UL BSR MAC CE, gNB may schedule UL grant at any time after receiving UL BSR MAC CE. Relay UE needs to estimate the upcoming UL data arrival time from remote UE to avoid triggering UL BSR too early. The data arrival time of upcoming UL data of remote UE can be determined from Time resource assignment IE in SCI. Herein the Time resource assignment corresponding to SL retransmission or future periodic SL transmissions should be used to determine data arrival time of upcoming UL data from remote UE.

The SCI of SL initial transmission may include several, generally up to 2 SL retransmissions. In case of more than one SL retransmission resources indicated in the SCI of SL initial transmission, the data arrival time may be either determined from Time resource assignment of the first retransmission or second retransmissions. The one of the two to select may depend on the monitored SL link quality (e.g. RSRP (reference signal received power) of PSCCH (physical shared control channel)) from remote UE by relay UE to decide whether Time resource assignment of first or second retransmission information is used. For instance, with good SL link quality measurement, Time resource assignment of first SL retransmission may be used as it has high potential to receive the UL data of remote UE correctly after first retransmission. Otherwise, the Time resource assignment of second retransmission is used. In another embodiment, whether/when the relay UE has triggered an Inter-UE coordination (IUC) towards remote UE for retransmission (i.e. whether/when the relay has provided a set of (non-)preferred resources to remote UE for retransmission) upon the unsuccessful reception of initial transmission may decide whether Time resource assignment of first or second retransmission information is used. For example, if remote UE has provided a set of (non-)preferred resources to remote UE for the first or second retransmission, Time resource assignment of first or second SL retransmission may be used as it has high potential to receive the UL data of remote UE correctly after first or second retransmission.

Where the future data transmission is not a retransmission but is one of a periodic set of data transmissions then the timing may be estimated from the periodic timing information associated with the set of periodic transmission.

Figure 1:
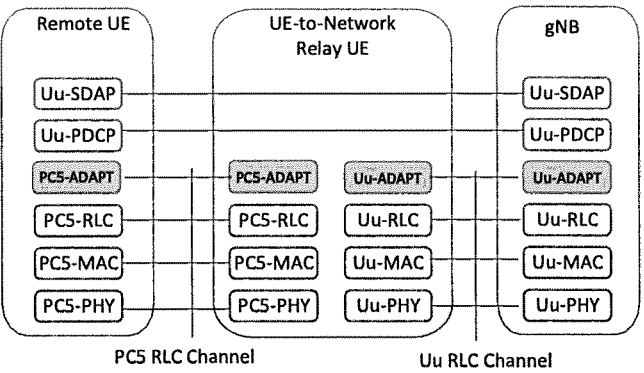
FIG. 1 illustrates the user plane protocol stack of L2 U2N relay.

The use of network nodes such as user equipment to relay data received from wireless devices or remote nodes such as a smart watch to a network node or base station with backhaul capability allows wireless signals with higher frequencies and thus, shorter ranges to be used. The agreement on user plane protocol stack of L2 based U2N (user equipment to network) relay is depicted in FIG. 1, in which the Uu-SDAP (user equipment to network service data adaptation protocol) and PDCP (packet data convergence protocol) are terminated between remote UE and gNB while the underneath protocol stack such as RLC (radio link control), MAC (medium access control) and PEW (physical) layer are terminated in each link of PC5 and Uu interface respective. Thus, the functions of lower layer protocol such as UL scheduling request (SR), UL buffer status report (UL-BSR), UL scheduling (e.g. UL dynamic grant or configured grant) should be supported for relayed traffic of remote UE over Uu (user equipment to network) interface between relay UE and gNB.

For L2 U2N relay as illustrated in FIG. 1, the remote UE's traffic is transmitted between remote UE and gNB via two links: i) SL over PC5 interface between remote UE and relay UE, and ii) UL/DL over Uu interface between relay UE and gNB, which introduces an additional delay/latency compared with direct link between remote UE and gNB. Furthermore, for delivery of remote UE's UL data to gNB, relay UE needs to request the UL resources (e.g. by sending UL SR and/or UL BSR to gNB) upon remote UE's data arriving in the relay UE's data buffer and then transmit remote UE's UL data to gNB after getting UL grant from gNB. Such sequential procedure as illustrated in FIG. 2 also prolongs the delay of remote UE's UL data delivery to gNB.

FIG. 2 schematically shows the transmission of data between a remote UE 60 via an intermediate relay UE 5 to a network gNB node 50. It shows how the two-stage transmission procedure can instigate a delay in the data transmission particularly where the initial step 1 of transmitting the initial transmission results in the data not being successfully received.

Thus, in an initial step 1 the remote UE 60 transmits an uplink transmission which comprises control information and data. Both the control information and data are sent in the same transmission time interval TTI. The control information comprises a plurality of indicators, a priority indication which indicates the priority of the sidelink channel used for the communication, a frequency resource assignment which indicates the frequency resource used for this transmission and for further retransmissions, in some cases up to two further retransmissions. A time resource assignment which indicates the timing delay between re-transmissions, a modulation and coding scheme indicator and some other indicators such as a resource reservation period indicator.

The relay UE 5 may be unable to decode the data that is received in the initial transmission and transmits a signal indicative of this at step 2. In this embodiment it is a HARQ NACK signal. In response to this the remote UE 60 transmits at step 3 a retransmission of the initial transmission. The relay UE 5 correctly receives the retransmission and sends a resource request comprising an UL-BSR to the gNB at step 4. The gNB 50 responds at step 5 with an uplink grant of resource or uplink resource allocation and the relay UE 5 responds at step 6 by transmitting the uplink data that it has received from the remote UE on the granted resource. As can be seen there is a significant delay between the initial transmission from the remote UE 60 and the final step 6 of sending this data to the gNB 50.

Figure 3:
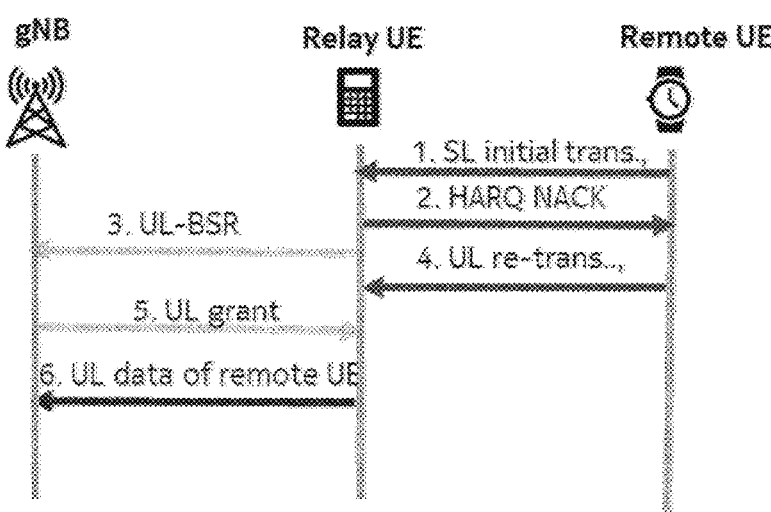
FIG. 3 shows a procedure for remote UE's UL data delivery according to an embodiment.

FIG. 3 shows how this delay may be reduced by an embodiment. In the procedure of FIG. 3 the relay UE 5 responds to receipt of the initial transmission from the remote UE 60 by transmitting an indication that it has not successfully received the data. Relay UE 5 also analyses the control information that it has received and estimates the amount of data it expects to receive when the data is retransmitted. It then generates an uplink resource request for transmission to the gNB 50 which includes this estimated amount of data at step 3, thus it requests an uplink grant prior to receiving the data. At step 4 the relay UE 5 receives the retransmitted data and shortly thereafter it receives the uplink grant at step 5. As it now has the data and the uplink grant it can transmit the uplink data of the remote UE at step 6 to the gNB significantly earlier than it was able to do following the process of FIG. 2.

It should be noted, that although in this example it is presumed that HARQ feedback is being used, embodiments also apply to sidelink transmission repetition, blind retransmission without the support of HARQ feedback. In such an embodiment, the initial sidelink transmission from the remote UE 60 indicates that HARQ is not applied, but still includes the control information of future retransmission in the SCI of initial SL transmission. If the data of initial SL transmission is not decoded correctly, the relay UE can still determine the relevant information regarding the upcoming uplink data based on the expected repetition of the sidelink transmissions which will occur automatically without the feedback.

FIG. 4 shows a flow diagram schematically illustrating steps in a method according to an embodiment.

At step 1 the initial transmission that contains control information and data is received from the remote UE. Decoding of the data fails. At step 2 the relay user equipment determines the expected properties of the uplink data that was not successfully received from the remote UE. It does this by determining the expected data volume from the frequency resource assignment and the modulation and coding scheme information elements of the control information which is in the SCI (side link control information). It also determines the uplink logical channels from the priority information element of the received SCI. In this regard, the priority information element indicates the priority of the sidelink channel and this can be mapped to the logical channel by looking at previously received transmissions and the logical channels and priority associated with them. Once the logical channel has been determined then the logical channel group can be determined from the configuration of the network. The expected arrival time of the retransmitted data is then determined from the time resource assignment information element in the control information as this indicates the retransmission timings for the data. In this regard, there may be multiple retransmissions and in which case it will determine whether it expects the data to arrive on the first or a subsequent retransmission. It will determine this from one of: the determined channel quality of the sidelink channel which maps to the likelihood that the next transmission will be successfully decoded; and/or the resource that is provided for the remote UE for retransmission and whether this is a preferred or non-preferred resource.

Once the arrival time of the retransmission is determined then a suitable time for transmitting the resource request can be estimated and this should be prior to the data being received but not too much earlier such that the data is received by the time the granted uplink resources are scheduled. In some embodiments, it may be within a predetermined time period prior to the estimated time of receipt of the retransmission.

Once these properties of the expected uplink data have been determined then a resource request is generated which might be a buffer status report and this is transmitted to the gNB at the determined time at step S3.

If the uplink grant is received and it is determined that the expected data has not arrived and is not due to arrive by the time that the resource is scheduled, then the uplink grant may be used to retransmit the resource request or an updated resource request. If remote UE can only use SL resource allocation (RA) mode 2 (i.e. UE autonomous resource selection) for its SL transmission to relay UE, the reserved resources for future periodic SL transmission may be re-evaluated or pre-empted if other SL UE with higher priority traffic indicates the overlapping SL resources for its SL transmission. If relay UE detects the remote UE resource re-evaluation or pre-emption based on its own sensing result, relay UE may be triggered to use UL grant to send an updated UL BSR instead of UL data of remote UE if UL data transmission is delayed from remote UE due to remote UE's resource re-evaluation or pre-emption.

In the above embodiments the Time reservation period IE in SCI of SL transmission is used to predict the time of the data retransmission, however, it may also be used by relay UE to determine the upcoming UL data from remote UE for periodic traffic so that relay UE may send early UL resource request to gNB if no suitable UL configured grant (CG) has been configured by gNB.

FIG. 5 schematically illustrates a flow diagram showing steps in a method according to an embodiment. In the initial step S10 a transmission is received from a remote UE at the intermediate relay UE. At step D5 it is determined if the relay UE can successfully decode the data. If it can then at step S70 it generates and transmits the resource request that indicates the amount of data that has been received. If it cannot then it proceeds to the steps of the method according to an embodiment and these comprise step S20 estimating the data amount from the control information which along with the data make up the initial transmission, followed by step S30 estimating the logical channel group. At step S40 the arrival time of the data in a subsequent retransmission is estimated. In this regard, the data may be retransmitted at set times indicated in the control information and the UE may estimate whether a first subsequent retransmission will be successful or whether it is more likely that the data will be successfully received only on the second retransmission. It may determine this from the quality of the sidelink channel or from the resources allocated to the remote device.

UE will then generate a resource request at step S50 and this resource request will contain the estimated data amount and the estimated logical channel group. It will then transmit at step S60 the resource request at a time that is selected in dependence on the estimated data arrival time. In this regard, it is desirable that the uplink grant is received shortly after the data has been received such that the data has arrived by the time of the scheduled resource for transmitting the data.

FIG. 6 shows a system according to an embodiment. The system comprises a remote UE 60 which in this embodiment is a smart watch, an intermediate relay UE 5 and a network node or base station 50. The relay intermediate UE 5 comprises an antenna 8, receiving and transmitting circuitry 10 for receiving and transmitting signals, determining circuitry 12, decoding circuitry 20, estimating circuitry 22, resource request generating circuitry 26 and control circuitry 24. Determining circuitry 12 determines from the decoded control information portion of a received transmission that data transmitted in the transmission is to be forwarded to a wireless communication node (base station 50) and also that the data will be retransmitted from the remote device 60. This data retransmission may occur because the decoding circuitry 20 was unable to decode the data. Where the data was not correctly decoded the UE 5 may generate and transmit a signal indicating this to the remote device 60, alternatively it may have received information that the remote device is operating in blind retransmission in which case no signal will be sent.

Estimating circuitry 22 estimates from the control information an amount of data that it expects to receive in the data retransmission and resource request generating circuitry 26 generates a resource request that includes the estimated amount of data and a logical channel group. Estimating circuitry 22 may also estimate an expected time of arrival of the data retransmission.

Control circuitry 24 controls transmission circuitry 10 to transmit the resource request at a time that depends on this estimated time. In this regard the request should be sent in advance of the expected arrival of data to reduce latency, but not too far in advance as it is desirable that the grant is received after the receipt of data so that the data is available at the time of the scheduled granted resource. Where the data does not arrive at the expected time, perhaps another UE has pre-empted the resource that was scheduled for the retransmission, then the granted uplink resource may be used to transmit an updated resource request for transmission of the delayed data when it does arrive.

In summary the proposed scheme significantly reduces the delay of remote UE's UL data delivery to gNB in U2N relaying by means of early triggering of UL SR or BSR before the actual UL data arrives due to SL retransmissions. In addition, the scheme avoids overflowing of transmission buffer at relay UE, particularly when the relay is serving multiple remote UEs, as the queuing delay at the relay UE is significantly reduced.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. An apparatus comprising at least one processor; and at least one memory storing instructions that, when executed by the at least one processor, cause the apparatus to:

receive a transmission comprising control information and data;

determine from said control information that said data is to be forwarded to a further wireless communication network node and that a future data transmission comprising data to be forwarded is scheduled;

estimate from said control information an amount of said data in said future data transmission, wherein said scheduled future data transmission comprises a retransmission of said data or a periodic data transmission;

generate a resource request said resource request comprising said estimated amount of said data in said future data transmission; and transmit said resource request towards said further wireless communication network node, wherein said control information comprises information regarding frequency resource and modulation and coding scheme that is to be used in said future data transmission, and said apparatus is caused to estimate said amount of said data from said frequency resource and modulation and coding scheme information.

2. The apparatus according to claim 1, wherein:

said control information further comprises a priority indication indicative of a priority of said data in said future data transmission;

said apparatus is caused to estimate from said priority indication and from a mapping from previously received data with said priority indication a logical channel group for forwarding said data; and said apparatus is caused to generate a buffer status report, said buffer status report comprising said amount of data and said logical channel group.

3. The apparatus according to claim 1, wherein said transmission is received on one or more sidelink channel.

4. The apparatus according to claim 1, wherein said control information further comprises time resource assignment, said time resource assignment indicating timings of said at least one future data transmission; and wherein said apparatus is configured to determine a time for transmission of said generated resource request in dependence upon said time resource assignment.

5. The apparatus according to claim 4, wherein said apparatus is configured to estimate a time of receipt of said future data transmission in dependence upon said time resource assignment, and said determined time for transmission of said generated resource request is determined to be prior to said estimated time of receipt of said future data transmission.

6. The apparatus according to claim 5, wherein said scheduled future data transmission comprises a retransmission of said data or a periodic data transmission and said future data transmission comprises said data retransmission and said time resource assignment indicates a timing of a plurality of said data retransmissions and said apparatus is caused to select one of said data retransmission timings when estimating said time of receipt of said data retransmission.

7. The apparatus according to claim 6, wherein said apparatus is caused to determine a quality of a channel a signal is received on and to select said one of said data retransmission timings in dependence upon said channel quality, a higher channel quality triggering selection of an earlier one of said plurality of data retransmission timings.

8. The apparatus according to claim 6, wherein said apparatus is caused to determine a resource allocated for said data retransmission and to select said one of said data retransmission timings in dependence upon said resource allocated.

9. The apparatus according to claim 4, wherein:

said apparatus is caused to transmit said resource request towards said further wireless communication node at said time determined by said apparatus.

10. The apparatus according to claim 1, wherein said apparatus is further caused to:

receive a grant of resource in response to said resource request; wherein said apparatus is caused in response to receipt of said grant of resource to transmit said data of said future data transmission on said granted resource where said future data transmission has been received and where said future data transmission has not been received to transmit an updated resource request on said granted resource.

11. A system comprising:

a remote wireless device;

a further wireless communication network node; and an apparatus according to claim 1, said apparatus comprising a relay node for relaying data from said remote wireless device to said further wireless communication network node; wherein said remote wireless device is configured to transmit wireless communication signals comprising control information and said data on one or more sidelink channels to said apparatus;

said apparatus is configured to estimate an amount of data in a future data transmission based on said control information and to generate a resource request and to transmit said resource request to said further wireless communication network node; and said further wireless communication network node is configured to provide a grant of resource for transmission of said estimated amount of data in said future data transmission from said apparatus to said further wireless communication network node in response to receipt of said resource request.

12. A method comprising:

receiving a transmission comprising control information and data;

determining from said control information that said data is to be forwarded to a further wireless communication node and that a future data transmission comprising data to be forwarded is scheduled;

estimating from said control information an amount of said data in said future data transmission, wherein said scheduled future data transmission comprises a retransmission of said data or a periodic data transmission;

generating a resource request said resource request comprising said estimated amount of said data in said future data transmission; and transmitting said resource request towards said further wireless communication node, wherein said control information comprises information regarding frequency resource and modulation and coding scheme that is to be used in said future data transmission, and said estimating comprises estimating said amount of said data from said frequency resource and modulation and coding scheme information.

13. The method according to claim 12, wherein said control information further comprises a priority indication indicative of a priority of said data in said future data transmission; said estimating from said priority indication and from a mapping from previously received data with said priority indication to a logical channel group for forwarding said data; said generating said resource request generating a buffer status report, said buffer status report comprising said amount of data and said logical channel group.

14. The method according to claim 12, wherein said control information further comprises time resource assignment, said time resource assignment indicating timings of said at least one future data transmission; and said estimating determining a time for transmission of said generated resource request in dependence upon said time resource assignment.

15. The method according to claim 14, wherein said estimating estimates a time of receipt of said future data transmission in dependence upon said time resource assignment, and said determined time for transmission of said generated resource request being determined to be prior to said estimated time of receipt of said future data transmission.

16. The method according to claim 15, wherein said method comprises estimating said determined time to be within a predetermined time period prior to the estimated time of receipt of the future data transmission.

17. A non-transitory computer readable medium comprising program instructions that, when executed by an apparatus cause the apparatus to perform at least the following:

determining from control information received in a transmission comprising data and said control information, that said data is to be forwarded to a further wireless communication node and that a future data transmission comprising data to be forwarded is scheduled;

estimating from said control information an amount of said data in said future data transmission, wherein said scheduled future data transmission comprises a retransmission of said data or a periodic data transmission; and generating a resource request said resource request comprising said estimated amount of said data in said future data transmission, wherein said control information comprises information regarding frequency resource and modulation and coding scheme that is to be used in said future data transmission, and said estimating comprises estimating said amount of said data from said frequency resource and modulation and coding scheme information.

\* \* \* \* \*